United States Patent [19]

McCurdy, Jr.

[11] Patent Number: 5,214,782
[45] Date of Patent: May 25, 1993

[54] POWER SUPPLY MONITOR FOR PERSONAL COMPUTER

[75] Inventor: Robert A. McCurdy, Jr., Spokane, Wash.

[73] Assignee: Generic Computer Services, North Hollywood, Calif.

[21] Appl. No.: 624,584

[22] Filed: Dec. 10, 1990

[51] Int. Cl.$^5$ .................. G06F 11/30; G06F 1/00
[52] U.S. Cl. .................. 395/750; 364/273.4; 364/948.5
[58] Field of Search .......................... 395/750

[56] References Cited

U.S. PATENT DOCUMENTS 4,307,455 12/1981 Juhasz ............................ 364/900
4,747,041 5/1988 Engel et al. ..................... 364/200

*Primary Examiner*—David Y. Eng
*Attorney, Agent, or Firm*—Gene W. Arant

[57] ABSTRACT

An indicator circuit for indicating whether the supply voltages of a personal computer are or have been out of tolerance includes window comparators, control circuitry providing each window comparator with a sensed fraction of a particular power supply voltage, and a pair of light emitting diodes of significantly different colors connected in parallel but in opposite polarities. One of the light emitting diodes is normally energized to indicate a normal operating condition, and the other light emitting diode is normally not energized. A latch circuit is provided to switch power from the one LED to the other, to indicate an alarm condition. Output signals from all the window comparators are fed to an OR circuit which in turn controls the latch.

3 Claims, 1 Drawing Sheet

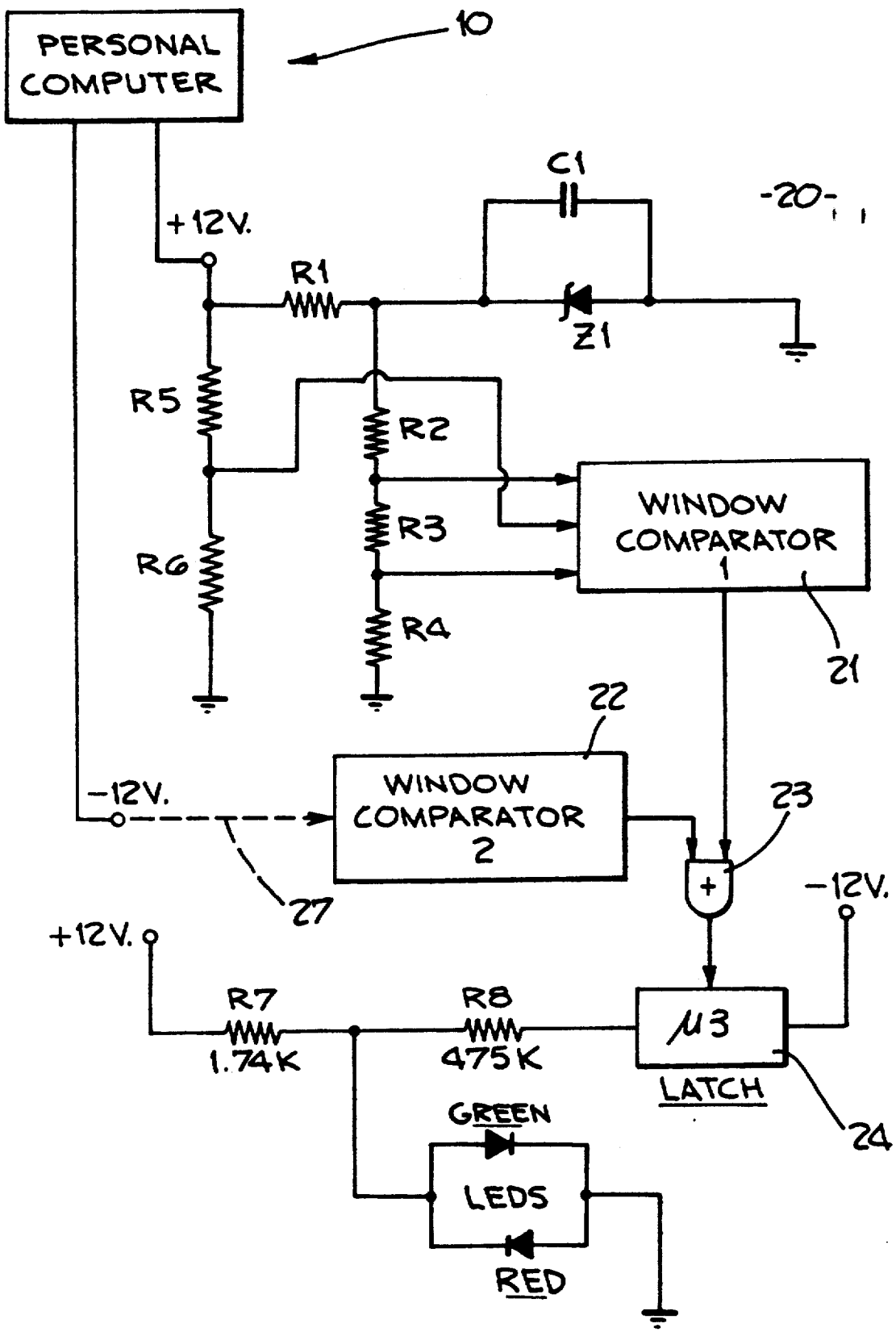

POWER SUPPLY MONITOR FOR PERSONAL COMPUTER

FIELD OF THE INVENTION

The invention relates to an indicator circuit that is used as an accessory to a personal computer in order to monitor the operation of its power supply circuits and to provide an alarm indication whenever the power supply is not operating correctly.

BACKGROUND OF THE INVENTION

The power supply circuits of a digital electronic computer have normal output voltage values which must be maintained within certain limits of variation if the data which the computer is processing is to be correctly reflected by the states of the various electronic circuits and magnetic devices that constitute the active circuits and the memory of the computer. A problem that sometimes arises is that an impermmissible variation has occurred in one or more of the power supply voltages, resulting in defective performance of one or more components of the computer, but the operator is not apprised of this condition.

SUMMARY OF THE INVENTION

According to the invention an indicator circuit is provided to indicate whether any power supply voltage presently is, or at any time since the computer was turned on, has been, out of tolerance. The visual output of the indicator circuit is provided by a pair of light emitting diodes, including a green one which is normally energized when the circuitry operation is proper and a red one which becomes energized whenever a problem has occurred.

The invention also provides a method of protecting the circuit integrity of a computer by normally energizing a light emitting diode associated with the computer to a green color, then whenever an abnormal power supply circuit operation occurs switching a latch circuit within the computer to a latched condition and in response to that latched condition energizing a red light emitting diode, then shutting off all power to the computer so as to de-energize the light emitting diodes and return the latch circuit to its normal unlatched condition, and after a time interval sufficient to allow the supply voltages of the power supply circuits to decay turning the computer power back on and thereby energizing the green light emitting diode unless a power supply circuit has again operated defectively.

DRAWING SUMMARY

The sole FIG. 1 of the drawing is a schematic representation of the indicator circuit of the present invention.

DETAILED DESCRIPTION

Referring now to the drawing, a personal computer 10 has one power supply terminal which normally provides an output voltage of plus 12 volts and another power supply terminal which normally provides an output voltage of minus 12 volts. An indicator circuit 20 for indicating whether either of the supply voltages is, or at any time since the computer was turned on, has been, out of tolerance, is schematically shown in the drawing. The positive voltage is monitored by Window Comparator 1 while the negative voltage is monitored by Window Comparator 2. Only the circuit associated with Comparator 1 is shown in detail.

A voltage reference circuit comprises a first resistor R1 and a Zener diode Z1 connected in series between the positive power supply terminal and ground, and a capacitor C1 coupled in parallel with the Zener diode. A first voltage divider circuit has second resistor R2, third resistor R3, and fourth resistor R4 connected in series, the first voltage divider circuit as a whole being connected in parallel with the Zener diode Z1.

A first Window Comparator 1 circuit, reference numeral 21, has first and second reference inputs coupled to the juncture of the R2 and R3 resistors and to the juncture of the R3 and R4 resistors, respectively. The values of R2, R3, and R4 are selected to provide an appropriate voltage window for the Comparator 1, which also has a signal input and a signal output. A second voltage divider circuit including resistors R5 and R5 is connected in series between the positive power supply terminal and ground. The juncture of the fifth and sixth resistors then provides an output voltage indicative of the state of the positive supply voltage, which is coupled to the signal input of Window Comparator 1. The values of resistors R5 and R6 are so selected that this output voltage should normally lie at the center of the voltage window of Comparator 1.

A pair of light emitting diodes identified only as Green and Red emit light of significantly different colors when energized. These diodes are connected in parallel but with mutually opposite polarities. Circuit means including a relatively small resistor R7 connects the positive power supply terminal to the anode of the Green light emitting diode for normally providing energizing current thereto.

A latch circuit 24, which is a semiconductor device also designated as U3, and a relatively large resistor R8 are connected in series between the negative power supply terminal and the juncture of resistor R7 with the Green light emitting diode. A signal line couples the signal output of Window Comparator 1 through an OR gate 23 to the latch circuit 24 for actuating the latch circuit whenever the voltage output of the voltage divider circuit R5/R6 falls outside the window established by the reference voltage inputs of that comparator. This actuation of the latch circuit causes the negative supply voltage to be connected through resistor R8 to the cathode of the Red LED, and because the value of resistor R8 is more than a hundred times that of resistor R7, it thereby de-energizes the Green LED and at the same time energizes the Red LED. The lighting of the Red LED then indicates an alarm condition.

Dotted line 27 indicates the control circuitry through which a voltage sensed from the negative supply output is provided to Window Comparator 2, reference numeral 22, for controlling its operation. Except for reversed polarity that circuitry is identical to the control circuitry shown for Comparator 1, and hence it need not be shown in detail. The signal output of Comparator 2 is also connected to an input of OR gate 23.

In operation, if at any time either of the +12 or −12 supply voltages varies so widely as to be considered outside acceptable tolerance, the voltage window of the associated Window Comparator will be exceeded, and an output signal is then fed through OR circuit 23 to latch circuit 24. As a result, the Green LED immediately goes dark and the Red LED lights up. This situation continues until to power to the computer is shut off, and the machine is re-powered after a suitable time delay.

While the presently preferred embodiment of the invention has been disclosed in considerable detail in order to comply with the patent laws, it will be understood by those persons skilled in the art that many variations are possible, and accordingly the scope of the invention is to be measured only in accordance with the appended claims.

What I claim is:

1. In combination with a personal computer having one power supply terminal of one polarity and another power supply terminal of an opposite polarity, an indicator circuit for indicating whether the supply voltage of the one terminal is or has been out of tolerance, said indicator circuit comprising:

means coupled to said one power supply terminal to provide a reference voltage;

a window comparator having a signal input;

means associated with said reference voltage means and coupled to said comparator to create a voltage window in said comparator;

means sensing a fixed portion of the output voltage of said one power supply terminal and coupled to said signal input of said comparator for delivering said sensed voltage thereto;

a pair of light emitting diodes of significantly different colors connected in parallel but in opposite polarity, one of said light emitting diodes being coupled to said one power supply terminal for normally receiving energizing current therefrom;

latch circuit means coupling the other of said light emitting diodes in series with the other of said power supply terminals and selectively operable for both interrupting the flow of current through said first light emitting diode and delivering current to said second light emitting diode; and said comparator having a signal output coupled to said latch circuit means for controlling the operation thereof.

2. An indicator circuit as claimed in claim 1 which also includes an additional comparator, means for sensing a fixed portion of the output voltage of said other power supply terminal and coupled to said additional comparator for delivering said sensed voltage thereto, and an "OR" circuit through which the outputs of both of said comparators are coupled to said latch circuit.

3. In combination with a personal computer having one power supply terminal of one polarity and another power supply terminal of an opposite polarity, an indicator circuit for indicating whether the supply voltage of the one terminal is, or at any time since the computer was turned on, has been, out of tolerance, said indicator circuit comprising:

a voltage reference circuit having a first resistor and a Zener diode connected in series between said one power supply terminal and ground, and a capacitor coupled in parallel with said Zener diode;

a first voltage divider circuit having second, third, and fourth resistors connected in series, said first voltage divider circuit being connected in parallel with said Zener diode;

a first window comparator circuit having first and second reference inputs coupled to the juncture of said second and third resistors and to the juncture of said third and fourth resistors, respectively, a signal input, and a signal output;

a second voltage divider circuit including fifth and sixth resistors connected in series between said one power supply terminal and ground, the juncture of said fifth and sixth resistors providing an output voltage which is coupled to said signal input of said comparator circuit;

a pair of light emitting diodes of significantly different colors connected in parallel but in opposite polarity;

means including a relatively small resistor connecting the one power supply terminal to one of said light emitting diodes for normally providing energizing current thereto;

a latch circuit and a relatively large resistor connected in series between the other power supply terminal and the juncture of said relatively small resistor with said one light emitting diode; and means coupling said signal output of said comparator to said latch circuit for actuating said latch circuit whenever the voltage output of said second voltage divider circuit falls outside the window established by said reference voltage inputs of said comparator, thereby de-energizing said one light emitting diode and energizing the other thereof.

* * * * *